United States Patent [19]
Jankowiak et al.

[11] 3,717,517

[45] Feb. 20, 1973

[54] COMPOSITION FOR COLORED SMOKE DISSEMINATION

[75] Inventors: Erwin M. Jankowiak, Sanford; Earl Thomas Niles, Midland, both of Mich.

[73] Assignee: The Dow Chemical Company, Midland, Mich.

[22] Filed: Nov. 12, 1970

[21] Appl. No.: 89,132

[52] U.S. Cl. ................................ 149/19, 149/84
[51] Int. Cl. ........................... C06b 3/00, C06b 5/06
[58] Field of Search ........................ 149/19, 20, 84

[56] References Cited

UNITED STATES PATENTS

| | | | |
|---|---|---|---|
| 3,147,161 | 9/1964 | Abere et al. | 149/84 X |
| 3,586,552 | 6/1971 | Potts et al. | 149/19 |

*Primary Examiner*—Benjamin R. Padgett
*Attorney*—Griswold & Burdick, Jerome L. Jeffers and William R. Norris

[57] ABSTRACT

Disclosed is a composition for the pyrotechnic dissemination of colored smoke. The composition contains an oxidizer, a material which produces a colored smoke cloud when heated and a binder fuel. The binder fuel is the copolymerization product of a polyaziridinyl compound and a polyfunctional amine or mercaptan terminated curing agent.

10 Claims, No Drawings

COMPOSITION FOR COLORED SMOKE DISSEMINATION

BACKGROUND OF THE INVENTION

Compositions for the dissemination of colored smoke serve as daytime signaling devices for both military and civilian use. Such compositions have been prepared by pressing an oxidizer, color emitter and organic binder at high pressures to form a coherent composition which upon ignition emits a cloud of colored smoke. This method has the disadvantage of requiring the dangerous high pressure treatment of unstable materials and restricts the size and shape of the grains which are prepared. A castable composition, i.e. one that can be poured into a mold and allowed to harden into a solid grain is desirable. In such a system, a castable mixture is prepared by combining an oxidizer, liquid resin-curing agent combination and colored smoke producing composition, i.e. dye, which is poured into a mold and cured. A problem arises in the use of many resin based binder systems due to the fact that they burn at temperatures which are sufficiently high to pyrolize the more heat sensitive dyes rather than disseminate them.

It is an object of the present invention to provide a novel composition for the dissemination of colored smoke.

An additional object is to provide such a composition which may be prepared by pour casting with curing at moderately elevated temperatures.

An additional object is to provide such a composition which burns at a temperature sufficiently low to avoid pyrolysis of heat sensitive dyes.

The present invention is a polymer-bonded pyrotechnic formulation for colored smoke dissemination which comprises an oxidizer, a polymeric binder and a dye. The oxidizer, which makes up from about 16 to 40 per cent of the composition, is a particulate alkali metal or ammonium nitrate, chlorate or perchlorate. The binder, which comprises from about 15 to 32 per cent of the composition, is the copolymerization product of a polyaziridinyl compound and a polyfunctional amine or mercaptan terminated curing agent. The polyaziridinyl compound is selected from the group of:

Tris [2-(1-aziridinyl) ethyl] trimesate
Tris [2-(1-aziridinyl) ethyl] trimellitate
Bis [2-(1-aziridinyl) ethyl] terephthalate
Bis [2-(1-aziridinyl) ethyl] phthalate or
Bis [2-(1-aziridinyl) ethyl] isophthalate. The curing agent is selected from the group of ethylenediamine, diethylenetriamine, triethylenetetramine, tetraethylenepentamine, pentaethylenehexamine, 1,2-bis (thioethylamino) propane and ethylene mercaptan. The balance of the composition is a particulate dye for the pyrotechnic dissemination of colored smoke. The dyes are selected from those compositions which can be heat vaporized to form a colored smoke cloud.

The preferred amounts of components in the formulation are from 24 to 32 per cent oxidizer, 22 to 30 per cent binder with the dye accounting for the remainder. When good surveillance at elevated temperatures is desired the preferred ratio of polyaziridinyl compound to curing agent is from 4:1 to 6:1.

Particle size of the dye if not critical to operability of the invention. In general, particles ranging in size from 15 $\mu$ to 2000 $\mu$ in their longest dimensions are preferred. Multi-modal size distribution of the particles is desirable for optimum packing properties. The particle size distribution necessary for the preparation of a castable composition will vary with the dye composition employed. This size distribution is readily determined by routine experimentation.

The oxidizer particles should range in size from 15 $\mu$ to 300 $\mu$ in their longest dimension with a particle size range of from 20 $\mu$ to 250 $\mu$ being preferred.

Premixing of the proper size oxidizer and dye particles and subsequent blending of the mixture with the liquid binder components provides a composition which can be pour cast into the desired configuration and cured into a coherent grainlike munition. The munition is readily ignited by conventional means to produce a colored smoke cloud.

The invention is further illustrated by the following examples in which all percentages are by weight, as are all percentages and ratios disclosed herein.

EXAMPLE I:

A composition for the dissemination of green smoke was prepared by dry mixing 40 percent of a fine particle size green dye and 32 percent particulate $KClO_3$. The green dye consisted of a mixture of 70.1 percent Solvent Green III, 20.9 percent Benzanthrone and 9.0 percent Vat Yellow IV. The individual dyes are described more fully in Military Specifications (hereafter Mil-Spec) D 3277A, D50074B and D50029B respectively. The $KClO_3$ is described in Mil-Spec P-150B. To the dye/oxidizer combination was added 24.2 percent Tris [2-(1-aziridinyl) ethyl] trimellitate and 3.8 percent triethylenetetramine (TETA). The composition, which was only marginally castable, was cured to a hard tough grain by heating at 70° C. for approximately 1 hour. A set of 23 gm. munitions having the above composition was placed in surveillance. Table I sets out the performance and surveillance data of the formulation.

TABLE I

Surveillance and Performance Data on Formulation Prepared in Example I

| Parameter | Original Munition | Surveillance Munitions 4 wks. | 8 wks. | 12 wks. |
|---|---|---|---|---|
| Exhaust diameter, in. | 0.25 | 0.25 | 0.375 | 0.375 |
| Burning rate, in./sec. | 0.024 | 0.018 | 0.020 | 0.020 |
| Combustion time, sec. | 29 | 38 | 34 | 34 |
| Flaming | None | None | None | None |
| Vaporization eff., %[1] | 83 | 87 | 97 | 89 |
| Yield, %[2] | 33 | 35 | 38 | 35 |
| Color index[3] | 1.08 | 1.09 | 1.17 | 1.13 |

[1]Vaporization eff. = amt. of aerosolized dye/amt. of dye in formulation
[2]Yield % = amt. of aerosolized dye/total wt. of formulation
[3]The green dye consisted of two yellow dyes and one blue one. When munitions containing this mixture are functioned, gradations of smoke color are produced depending upon the combustion characteristics of the formulation. A color index, which is determined by spectrophotometric measurements, of unity would indicate that the green dye components were disseminated in the same ratio as they occur in the original green dye. It has been discovered that a composition having a color index of about 1.2 appears more truly green than those having a color index of unity.

EXAMPLE II:

A formulation was prepared as in Example I by blending 45 percent of the granular green dye, 27.5 percent $KClO_3$, 22 percent Tris [2-(1-aziridinyl) ethyl] trimellitate and 5.5 percent TETA. The composition, which was pour castable, was cured at 70° C. for approximately 2 hours. Upon ignition the formulation was found to have the following properties:

Table II

| | |
|---|---|
| Burning rate, in./sec. | 0.07 |
| Combustion time, sec./23gm. | 12 |
| Cloud Color | dense dark green |
| Cloud Density | Dense |
| Vaporization Efficiency, % | 88 |
| Smoke Yield, % | 40 |
| Color Index | 1.08 |

Example III:

A formulation for the dissemination of yellow smoke was prepared by blending a particulate yellow dye of composition Vat Yellow IV (35.7 percent) and Benzanthrone (64.3 percent) in an amount equal to 40 percent of the formulation. The remainder of the formulation consisted of 32 percent $KClO_3$, 24.2 percent Tris [2-(1-aziridinyl) ethyl] trimellitate and 3.8 percent TETA. A formulation for disseminating white smoke was prepared as above except that a granular white dye 2-chloro-anthraquinone was employed. A munition for dissemination of red smoke was prepared with 50 percent particulate 1-methylaminoanthraquinone dye, 24.9 percent $KClO_3$, 21.9 percent trimellitate and 3.2 percent TETA. Performance and 12-week surveillance data for these formulations are given in Tables III, IV and V.

Table III

Performance and Surveillance Data - Yellow Dye

| Parameter | Performance Original | 12 weeks at 72° C. |
|---|---|---|
| Weight of grain, gm. | 23 | 23 |
| Burning rate, in./sec. | 0.061 | 0.065 |
| Combustion time, sec./23gm. | 14 | 13 |
| Vaporization eff., % | 92 | 99 |
| Smoke yield, % | 37 | 40 |
| Color | Good | Good |

Table IV

Performance and Surveillance Data - White Dye

| Parameter | Performance Original | 12 weeks at 72° C. |
|---|---|---|
| Weight of grain, gm. | 23 | 23 |
| Burning rate, in./sec. | 0.034 | 0.030 |
| Combustion time, sec./23gm. | 22 | 28 |
| Vaporization eff., % | 93 | 91 |
| Smoke yield, % | 37 | 36 |
| Color | Good | Good |

Table V

Performance and Surveillance Data - Red Dye

| Parameter | Performance Original | 12 weeks at 72° C. |
|---|---|---|
| Weight of grain, gm. | 23 | 23 |
| Burning rate, in./sec. | 0.024 | 0.026 |
| Combustion time, sec./23gm. | 36 | 33 |
| Vaporization eff., % | 87 | 87 |
| Smoke yield, % | 44 | 44 |
| Color | Good | Good |

EXAMPLE IV:

In a manner similar to that of the previous examples a composition for dissemination of violet smoke was prepared from the following components:

| Component | Wt. % of Composition |
|---|---|
| Binder | 22.5% (80% trimellitate) (20% TETA) |
| Oxidizer | 27.5% ($KClO_3$) |
| Dye | 50% - The dye employed corresponded to Mil-Spec D3691 A which is a mixture of 81.5% 1,4-diamino-2, 3-dihydroanthraquinone (Mil-Spec D3668A) and 18.5% 1-methylaminoanthraquinone (Mil-Spec D3284A). |

Additional dyes that may be used in the present invention include:

Orange:
1. 1-Benzoazo-2-napthol
2. 4,5-Dibromo-3,6-fluorandial
3. 1,2-Dihydroxy antraquinone
4. 1-0-Tolylazo-2-napthol Yellow:
1. 1,2 Benzpyrene
2. 4-Dimethylaminoazobenzene
3. 9-Diethylamino-7-phenyl-5-benzophenazinone
4. 2-(4-Dimethylaminoazophenyl) naphthalene Others:
1. 1-Hydroxy-4-paratoluidinoanthraquinone (violet)
2. 1,4-Di-p-toluidinoanthraquinone (green)
3. 2, 4, 5, 7-tetrabromo-3,6-fluorandiol (red)
4. 1-Xylylazo-2-naphthol (red)

WE CLAIM:

1. A polymer-bonded, pyrotechnic formulation for colored smoke dissemination which comprises:
   a. from about 16 to 40 percent of a particulate nitrate, chlorate or perchlorate of an alkali metal or ammonium as oxidizer;
   b. from about 15 to 32 percent of the copolymerization product of a polyaziridinyl compound selected from the group of:
   Tris [2-(1-aziridinyl) ethyl] trimesate,
   Tris [2-(1-aziridinyl) ethyl] trimellitate,
   Bis [2-(1-aziridinyl) ethyl] terephthalate,
   Bis [2-(1-aziridinyl) ethyl] phthalate or
   Bis [2-(1-aziridinyl) ethyl] isophthalate and
   a polyfunctional amine or mercaptan terminated curing agent selected from the group consisting of ethylenediamine, diethylenetriamine, triethylenetetramine, tetraethylenepentamine, pentaethylenehexamine, 1,2-bis (thioethylamino) propane and ethylene mercaptan as binder, and
   c. the balance of a particulate dye for the pyrotechnic dissemination of colored smoke.

2. The formulation of claim 1 which is made up of 24 to 32 percent oxidizer, 22 to 30 percent binder and the balance of the dye to be disseminated.

3. The formulation of claim 1 wherein the ratio of polyaziridinyl compound to curing agent is from 4:1 to 6:1.

4. The formulation of claim 3 wherein the binder is made up of the copolymerization product of Tris [2-(1-aziridinyl) ethyl] trimellitate and triethylenetetramine.

5. The formulation of claim 4 wherein the dye is a mixture of Solvent Green III, Benzanthrone and Vat Yellow IV.

6. The formulation of claim 4 wherein the dye is 1-methylaminoanthraquinone.

7. The formulation of claim 1 wherein the particle size of the dye is within the range of from 15 $\mu$ to 2,000 $\mu$ in the longest dimension.

8. The formulation of claim 1 wherein the particle size of the oxidizer is from 20 $\mu$ to 250 $\mu$.

9. The formulation of claim 1 wherein the dye is a mixture of Vat Yellow IV and benzanthrone or 2-chloro-anthraquinone.

10. The formulation of claim 1 wherein the dye is a mixture of 1,4-diamino-2,3-dihydroanthraquinone, and 1-methylaminoanthraquinone.

* * * * *